(12) United States Patent
Coulton

(10) Patent No.: US 6,786,013 B2
(45) Date of Patent: Sep. 7, 2004

(54) BUILDING STRUCTURE AND SPACER USED THEREIN

(75) Inventor: Michael S. Coulton, Lansdale, PA (US)

(73) Assignee: Benjamin Obdyke Incorporated, Horsham, PA (US)

(*) Notice: Subject to any disclaimer, the term of this patent is extended or adjusted under 35 U.S.C. 154(b) by 444 days.

(21) Appl. No.: 09/875,074

(22) Filed: Jun. 6, 2001

(65) Prior Publication Data

US 2001/0054263 A1 Dec. 27, 2001

Related U.S. Application Data

(60) Provisional application No. 60/211,433, filed on Jun. 14, 2000.

(51) Int. Cl.[7] .............................................. E04H 12/28
(52) U.S. Cl. ........................ 52/198; 52/269; 52/302.3; 405/45
(58) Field of Search ........................... 52/198, 199, 269, 52/270, 503, 302.1, 302.3, 302.6; 428/174, 180; 405/45

(56) References Cited

U.S. PATENT DOCUMENTS

| 27,872 | A | * | 4/1860 | Walcott ...................... 454/260 |
|---|---|---|---|---|
| 2,264,961 | A | | 12/1941 | Ward |
| 2,339,220 | A | | 1/1944 | Crowley |
| 3,660,955 | A | | 5/1972 | Simon ......................... 52/420 |
| 3,955,019 | A | * | 5/1976 | Keith .......................... 264/248 |
| 4,446,661 | A | | 5/1984 | Jonsson et al. ................. 52/95 |
| 4,538,388 | A | | 9/1985 | Friesen ........................ 52/199 |
| 4,631,221 | A | * | 12/1986 | Disselbeck et al. .......... 428/166 |
| 4,840,515 | A | * | 6/1989 | Freese ......................... 405/36 |
| 4,956,951 | A | * | 9/1990 | Kannankeril .................. 405/36 |
| 5,099,627 | A | | 3/1992 | Coulton et al. ............... 52/408 |
| 5,201,154 | A | * | 4/1993 | Thomas ....................... 428/180 |
| 5,383,314 | A | * | 1/1995 | Rothberg ....................... 405/43 |
| 5,489,462 | A | | 2/1996 | Sieber .......................... 428/174 |
| 5,673,521 | A | * | 10/1997 | Coulton et al. .............. 126/671 |
| 5,688,073 | A | * | 11/1997 | Brodeur et al. ................ 405/36 |
| 5,692,348 | A | * | 12/1997 | Ambrosino .................. 405/43 |
| 5,826,390 | A | | 10/1998 | Sacks ........................... 52/408 |
| 5,860,259 | A | * | 1/1999 | Laska ......................... 52/302.3 |
| 5,888,614 | A | * | 3/1999 | Slocum et al. .............. 156/164 |
| 5,902,432 | A | | 5/1999 | Coulton et al. .............. 156/199 |
| 5,960,595 | A | | 10/1999 | McCorsley, III et al. ...... 52/199 |
| 6,355,333 | B1 | | 3/2002 | Waggoner et al. ........... 428/174 |

FOREIGN PATENT DOCUMENTS

| CA | 1015173 | * | 3/1977 |
|---|---|---|---|
| CA | 1230980 | * | 1/1988 |
| JP | 60-124419 | | 8/1985 |
| JP | 01-083805 | | 6/1989 |

OTHER PUBLICATIONS

Brochure of KO Sangyo Co., Ltd., "Rib Sheet", 1988 (month unknown), English translation included.

* cited by examiner

*Primary Examiner*—Lanna Mai
(74) *Attorney, Agent, or Firm*—Howson and Howson

(57) ABSTRACT

A roll-form spacer product providing an air space and drainage passageways within a building structure. Preferably, the spacer product is a thermoplasic web of material having hollow spacer elements formed integrally thereon. A first set of spacer elements projects outwardly from one face of the web and a second set of spacer elements projects from the other face of the web. The first and second sets of spacer elements are offset, project in opposite directions, and create air space and drainage passageways along each face. Thus, in a wall or roof construction, air, vapor and water are provided with exit paths extending along both the inner sheathing member and the outer building material. In addition, the web can also be provided with apertures for creating transverse paths therethrough.

22 Claims, 3 Drawing Sheets

US 6,786,013 B2

BUILDING STRUCTURE AND SPACER USED THEREIN

This application claims the benefit of priority of U.S. Provisional Patent Application No. 60/211,433 filed Jun. 14, 2000.

FIELD OF THE INVENTION

The present invention relates to creating a drainage plane and air space within a building structure to prevent the accumulation of moisture within the structure, and more particularly, the present invention relates to a spacer product which is utilized in a wall and/or roof construction and which provides a drainage path and air space adjacent both an inner sheathing member and an outer building material to retard deterioration of the structure.

BACKGROUND OF THE INVENTION

An openwork member for use in providing a path of ventilation in a roof or wall of a building structure is disclosed in U.S. Pat. No. 5,099,627 which issued to Coulton et al. and which is assigned to the assignee of the present application. The openwork member is located between an inner sheathing member and an outer building material, such as wooden shingles. The openwork member provides vapor flow paths therethrough to prevent moisture from becoming entrapped adjacent the inner sheathing member and adjacent the outer building material. As disclosed in the '627 patent, the preferred embodiment of an openwork member is made of a resilient matrix of matted self-supporting filaments providing multiple vapor flow paths therethrough.

A related form of vent is a roof ridge vent. Roof ridge vents have been provided by elongate, roll-form, sheet-like, thermoplastic webs as disclosed in U.S. Pat. Nos. 5,902,432 and 5,673,521 which issued to Coulton et al. and which are assigned to the assignee of the present application. These plastic sheet-like vents are thermoformed with hollow spacer elements projecting from one face thereof. Thus, one face of the vent is spaced from the roof ridge by the spacer elements and one face lies flush with overlying roof ridge cap shingles.

Another example of a roof ridge vent which utilizes spacer elements is U.S. Pat. No. 3,660,955 issued to Simon. The vent disclosed in the Simon patent provides a path for air circulation between overlapping shingles located on a roof ridge. A row of spacer elements are located between the overlapping shingles to provide and define ventilation paths. FIG. 12 of the Simon patent discloses an elongated strip of sheet material which has solid spacer elements secured to one face thereof and which can be provided in roll-form.

Although the above roof ridge vents made of sheet-like webs having spacer elements projecting from one face thereof have been considered as a cost effective replacement for the openwork member described in the above referenced '627 patent, the sheet-like webs have a disadvantage in that they provide a drainage path and/or air space adjacent only one side of the vent, ie. the side of the vent with the spacer elements. Thus, if moisture accumulates on the side of the vent opposite the spacers, the moisture is entrapped by the vent and will cause premature deterioration of the building structure. Thus, use of such vents between an inner sheathing member and an outer building material is not recommended.

Entrapped moisture is particularly a problem on wall structures of buildings covered with a housewrap product. Typical housewraps utilized in building constructions are particularly engineered to permit the one-way passage of vapor therethrough so that moisture vapor can escape the building but cannot enter the building. Vapor which is permitted to pass through the housewrap must be provided with a drainage path through the remainder of the wall; otherwise, condensation will form and become entrapped within the wall. Thus, plastic sheet-like vents with spacer elements on one side thereof cannot provide drainage paths along both the inner sheathing member and the outer building component, and do not provide a transverse drainage path through the vent. For these reasons, their use in wall constructions is not recommended.

The plastic sheet-like vents are also not recommended for use in roof constructions. To this end, if the side of the vent without spacers confronts the inner roof deck, any moisture which leaks through the shingles and nailholes, or other cracks in the plastic vents, will be entrapped on the roof deck. Alternatively, if the side of the vent without spacers confronts the outer wooden shingles, moisture absorbed by the shingles will not dry adjacent to the vent and will therefore deteriorate.

Therefore, while plastic roll-form vents having spacer elements disclosed in the above referenced patents may function satisfactorily as roof ridge vents, there is a need for a roll-form spacer product made of a web of thermoplastic material which can be utilized in a wall and/or roof construction to provide drainage paths and air spaces between an inner sheathing member and an outer building material. The product should be capable of inexpensive manufacture and should provide drainage and/or ventilation paths along both the inner sheathing member and the outer building material. Preferably, the spacer product should also provide a transverse drainage path through the vent.

OBJECTS OF THE INVENTION

With the foregoing in mind, a primary object of the present invention is to provide an efficient and economical spacer product which is capable of being readily installed in a wall or roof structure between an inner sheathing member and an outer building material and which provides drainage passageways and air spaces adjacent both the inner sheathing member and the outer building material.

Another object of the present invention is to provide a roll-form plastic sheet-like spacer product which has hollow spacer elements and which is capable of providing a path for the escape of liquid/vapor adjacent an inner sheathing member and an outer building material.

A further object of the present invention is to provide a building structure which includes an inner sheathing member, a plastic spacer product, and an outer building material.

SUMMARY OF THE INVENTION

More specifically, the present invention provides a spacer product which provides a drainage pathway and air space within a building structure so as to retard deterioration of the building structure. The spacer product is a continuous, indeterminate-length, roll-form web of thermoplastic material having front and rear faces. The web is capable of being rolled lengthwise into a spiral roll during manufacture and unrolled lengthwise in a substantially straight direction during installation.

The web has a first set of hollow spacer elements integrally formed thereon and projecting outwardly from the front face. Each spacer element has an apex portion spaced from the front face. Thus, a first drainage path and air space extends along the front face of the web. The web also has a second set of hollow spacer elements which project outwardly from the rear face of the web in an opposite direction relative to the first set of spacer elements. Each spacer element in the second set has an apex portion spaced from the rear face for creating a second drainage path and air space which extends along the rear face. In some contemplated embodiments of the present invention, the web can be provided with a series of apertures formed therein for creating additional drainage/air flow paths extending transversely through the web. Alternatively, the web can be provided without apertures.

According to another aspect of the present invention, a building structure is provided having a drainage passageway and air space therein so as to retard deterioration of the building structure. The structure includes an inner sheathing member providing a wall or roof of a building structure, a web of thermoplastic material affixed to and overlying the inner sheathing member, and an outer building material affixed to the inner sheathing member and overlying the web.

The web has a front face, a rear face, and first and second sets of integrally formed hollow spacer elements. The sets of spacer elements project outwardly from both the front and rear face of the web in opposite directions. Each spacer element has an apex portion spaced from either the front or rear face for defining drainage pathways and air spaces adjacent and along the front and rear faces. The web can be provided with, or without, a series of apertures formed therein. If utilized, the apertures can create additional drainage/air flow paths transversely through the web.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENT

Figure 1:
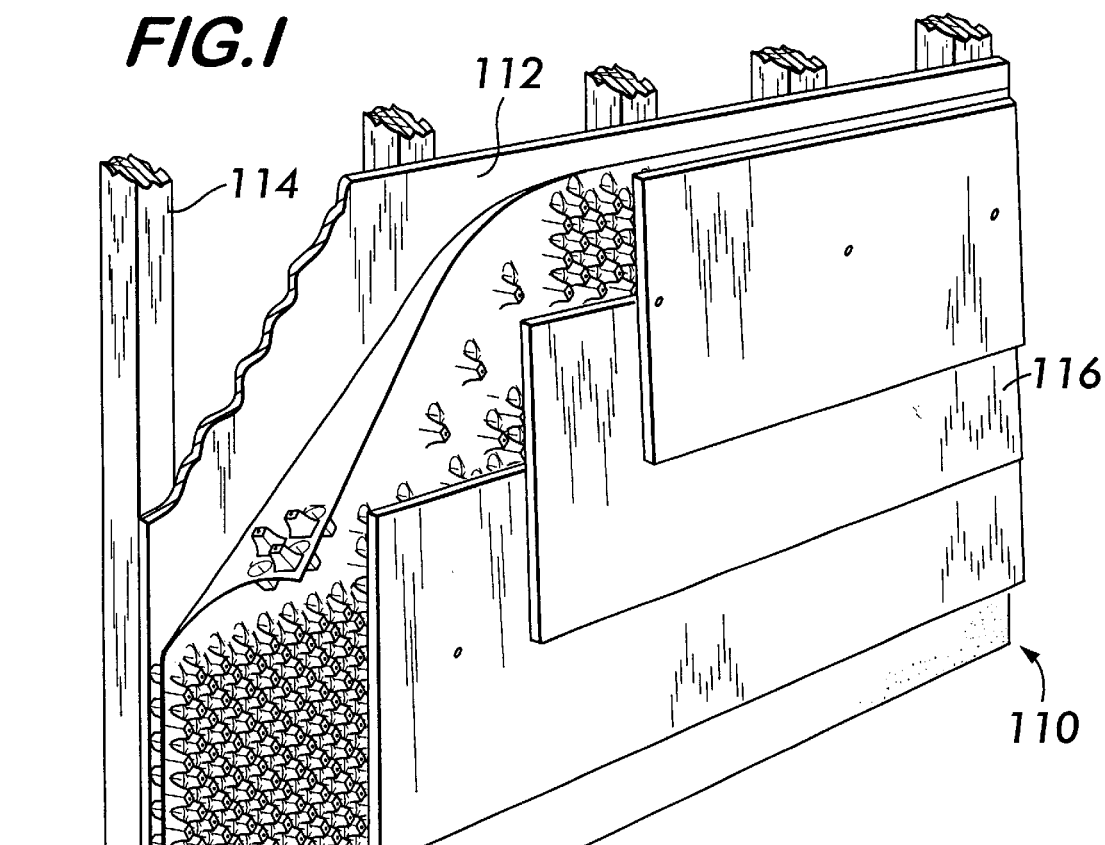
FIG. 1 is a perspective view of a sidewall construction for a building according to the present invention.
Figure 5:
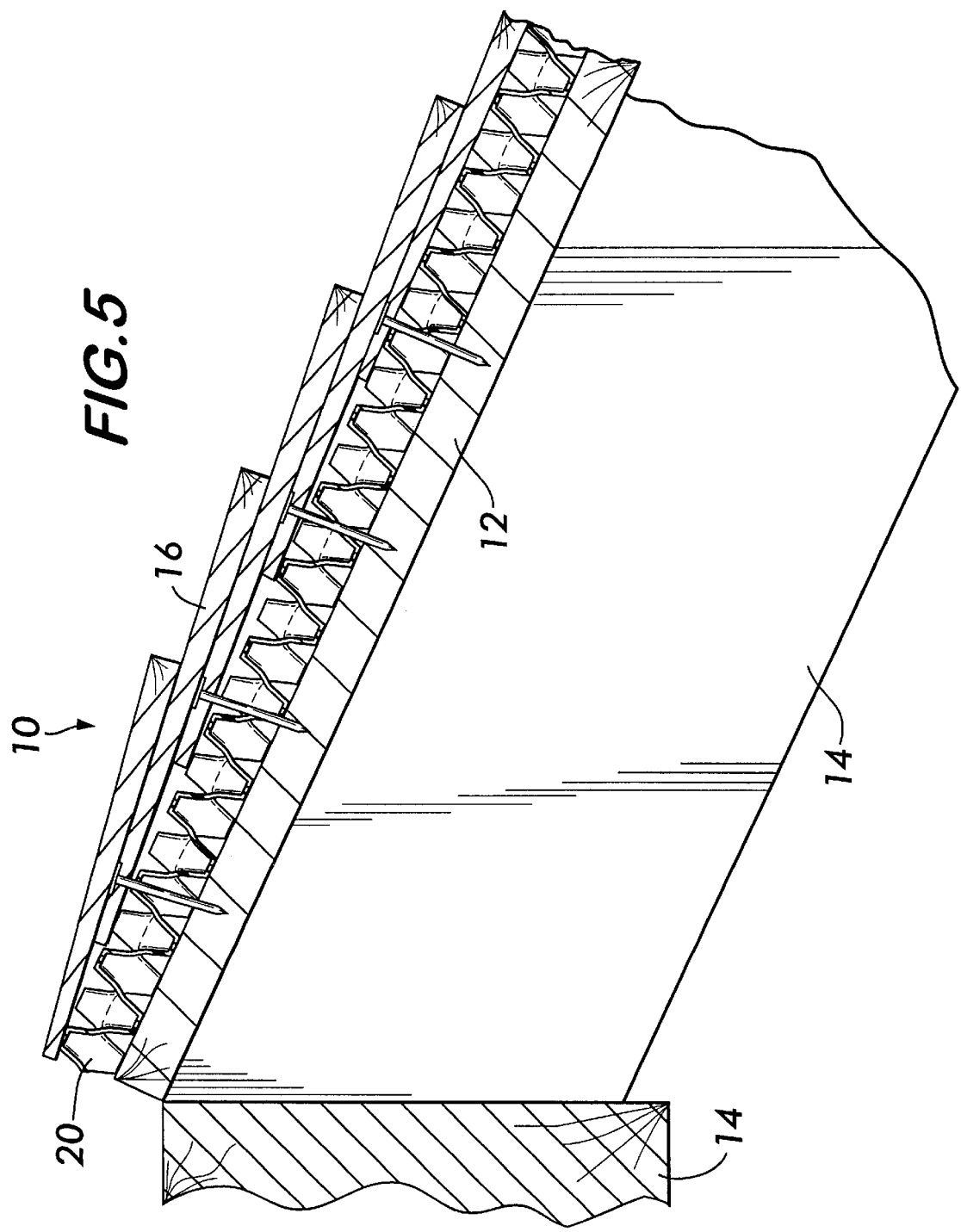
FIG. 5 is a perspective view of a roof construction for a building according to the present invention.

Referring now to the drawings, FIG. 5 illustrates a roof 10 having a construction according to the present invention, and FIG. 1 illustrates a sidewall 110 of a building having a construction according to the present invention. Both the roof and wall constructions, 10 and 110, utilize a spacer product 20 according to the present invention. The spacer product 20 provides an air space and a drainage passageway which enables the flow of air, vapor and liquids adjacent both sides of the spacer product 20 so that moisture is prevented from accumulating within the structure and is provided with a path to exit the structure. If desired, additional passageways can also be provided transversely through the spacer product 20; alternatively, the spacer product 20 can be provided without transversely extending passageways.

Figure 2:
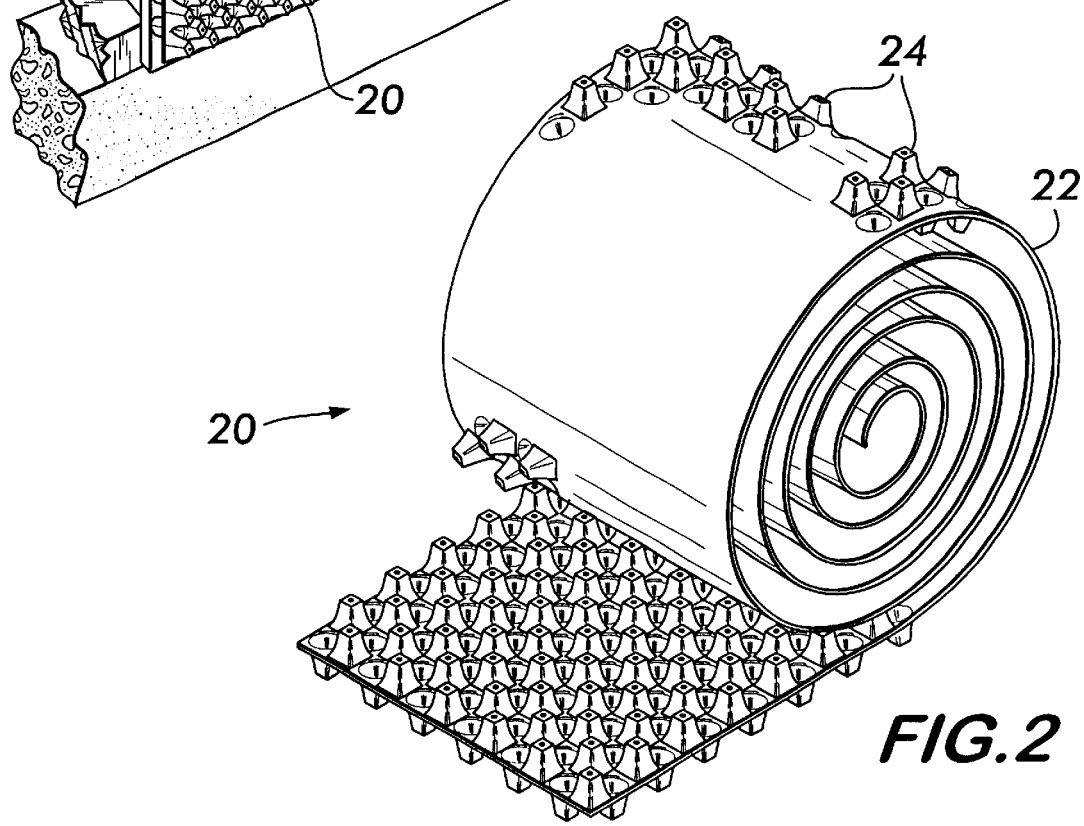
FIG. 2 is a is a perspective view of a spacer product in roll-form according to the present invention.
Figure 3:
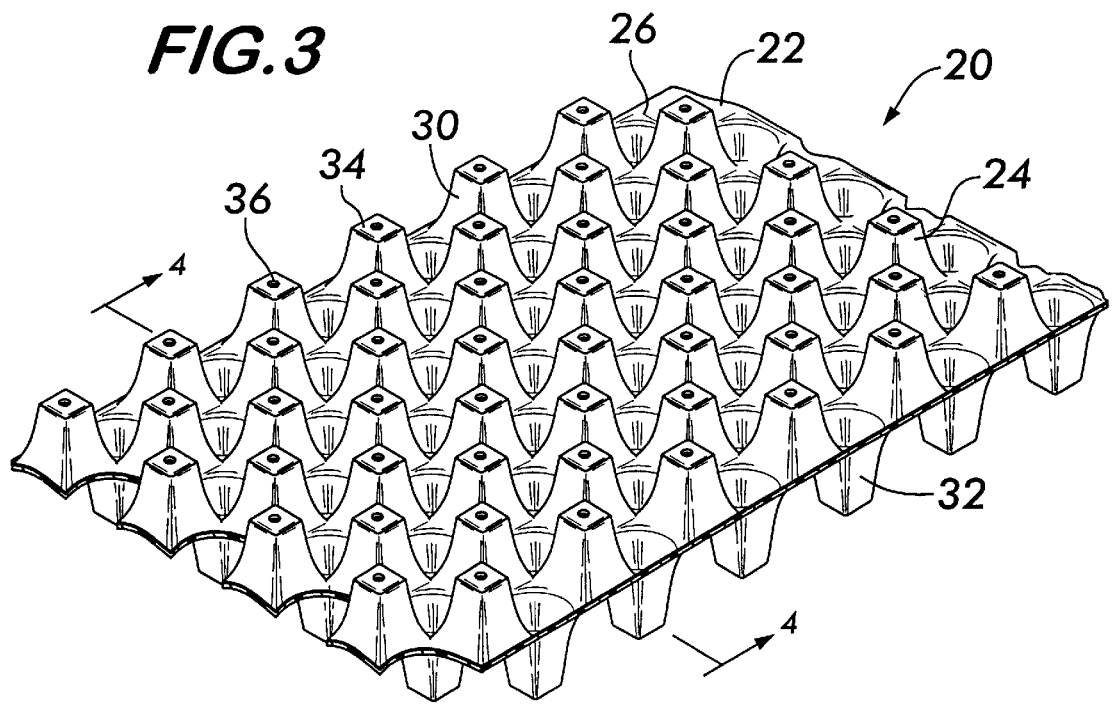
FIG. 3 is a perspective view of an unrolled portion of the spacer product illustrated in FIG. 2.
Figure 4:
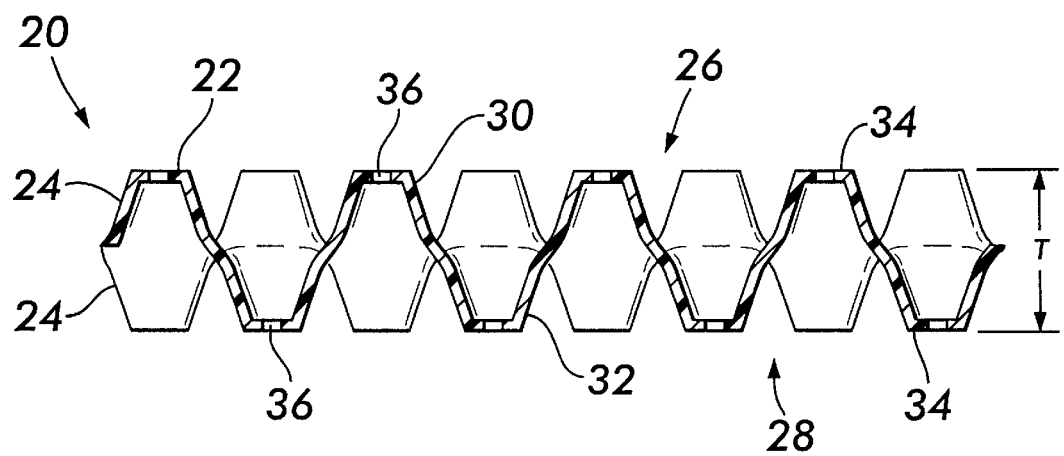
FIG. 4 is a cross sectional view of the spacer product illustrated in FIG. 3 along line 4—4.

Turning first to the preferred structure of the spacer product 20, it can be provided as a indeterminate length, continuous sheet, or web, 22 of material which has integral spacer elements 24 projecting therefrom and which is capable of being shipped, transported and stored in a roll-form condition. See FIG. 2. When the web 22 is unrolled onto a substantially flat surface, the web 22 has a front face 26 and a rear face 28. See FIGS. 3 and 4. A first set of spaced-apart spacer elements 30 project outwardly from the front face 26, and a second set of spaced-apart spacer elements 32 project outwardly from the rear face 28 such that the first and second set of spacer elements, 30 and 32, extend in opposite directions. As will be discussed, this structure enables both the front and rear faces, 26 and 28, to be spaced from adjacent structures so that air spaces, drainage paths and ventilation paths are provided adjacent each face, 26 and 28.

Preferably, as illustrated, the spacer elements 24 are hollow and are formed by integral portions of the web 22 having been deformed outwardly by a forming technique. For instance, the spacer product 20 can be made by the processes disclosed in U.S. Pat. Nos. 5,902,432 and 5,673,521, the disclosures of which are incorporated herein by reference. To this end, the web 22 can be made of, for instance, high impact polystyrene (HIPS), ABS, high-density polyethylene (HDPE), high-density polypropylene (HDPP), PVC, or a blend of any of these suitable polymers and can be shaped by thermoforming, vacuum stamping, or any other suitable techniques.

Each of the illustrated spacer elements 24 have a cone-shape with a truncated apex portion 34 which has an aperture 36 formed therein. The apertures 36 provide a transverse path for air, vapor and liquid flow through the web 22. Alternatively, the apertures can be located at other locations on the web 22, and the spacer elements 24 can be provided in other shapes. For instance, the apertures 36 could be located on the sidewalls of the cone-shaped spacer elements to allow rain water to trickle vertically down the web 22. However, preferably each of the first and second sets of spacer elements, 30 and 32, are provided in a grid pattern to uniformly support the web 22 from adjacent structures. In addition, preferably the first set of spacer elements 30 are uniformly offset from the second set of spacer elements 32. Also, to enable ease of installation, selected portions (not shown) of the web 22 may have spacer elements 22 extending from only one of the faces, 26 or 28, of the web 22.

Turning to the roof construction 10, it has a construction similar to that disclosed in U.S. Pat. No. 5,099,627, the disclosure of which is incorporated herein by reference. To this end, the roof structure 10 includes an inner sheathing member, in this case a deck member 12, which is affixed to rafters 14. The deck member 12 is typically made of plywood, particle board or other materials typically permitted by local building codes and is typically lined with a membrane, in this case a layer of roofing felt (not shown).

The spacer product 20 is unrolled over the roofing felt and secured to the deck member 12 with nails, staples, adhesives or the like. The face 26 of the web 22 is directed toward the roofing felt and the deck member 12 and is spaced therefrom by the first set of spacer elements 30. To this end, the apex portions 34 confront the roofing felt and a venting air space is provided along the face 26 of the web 22 between the spacer elements 30 and between the face 26 and the roofing felt. Thus, any vapor which exists in this area can be vented via the air space and any moisture which collects will be dried by the circulation of air. In addition, any rain water which leaks into the building structure will be provided with a drainage path to trickle downwardly and out of the roof structure. In addition, the apertures 36 formed in the apex portions 34 aid in the drying of any moisture which is located under the apex portions 34 and provides a drainage path for water.

An outer building material is affixed to the deck member 12 such that it overlies the spacer product 20. In this case, the outer building material is wooden shingles 16, such as, cedar shakes. Of course, other outer building materials can also be utilized, such as, metal roofing materials. The face 28 of the web 22 is directed toward the shingles 16 and is spaced therefrom by the second set of spacer elements 32. To this end, the apex portions 34 of the second set of spacer elements 32 confront the shingles 16, and an air space is provided in along the face 28 of the web 22 between the spacer elements 32 and between the face 28 and the shingles 16. Thus, any moisture which is absorbed into the building facing surface of the shingles 16 will be dried by the circulation of air. In addition, any rain water which leaks into the roof structure is provided with a drainage path along the spacer product to trickle downwardly and out of the roof structure. In addition, the apertures 36 formed in the apex portions 34 will aid in the drying of any moisture which is located under the apex portions 34 and provides a drainage path.

Turning to the wall construction 110, it has a construction similar to that of the roof 10. To this end, the wall structure 10 includes an inner sheathing member 112, which is affixed to support posts 114 of the building. The inner sheathing member 112 is typically made of plywood, particle board or other materials typically permitted by local building codes and can be lined with a membrane, such as, a one-way vapor permeable housewrap (not shown). Examples of other membranes include asphalt impregnated felt and building paper.

The spacer product 20 is unrolled and secured to the inner sheathing member over the housewrap. The face 26 of the web 22 is directed toward the housewrap and is spaced therefrom by the first set of spacer elements 30. To this end, the apex portions 34 confront the housewrap and an air space is provided extending along the face 26 of the web 22 between the spacer elements 30 and between the face 26 and the housewrap. Thus, any moisture which collects in this area will be provided with a path to drain downwardly and out of the wall. This is particularly important with respect to the use of a housewrap which permits vapor to escape outwardly from the building. If not properly vented, such vapor will condensate within the wall structure 110 and will lead to the deterioration of the wall 110. The apertures 36 formed in the apex portions 34 aids in the drying of any moisture which is located under the apex portions 34 and provides additional drainage paths for water flowing down the wall.

An outer building material is affixed to the inner sheathing member 112 such that it overlies the spacer product 20. In this case, the outer building material is a siding material 116, such as, a wood or bonded fiber siding product. Of course, other outer building materials can also be utilized, such as, brick, fiber cement materials, vinyl materials, stucco, EIFS or other siding materials. The face 28 of the web 22 is directed toward the siding 116 and is spaced therefrom by the second set of spacer elements 32. To this end, the apex portions 34 of the second set of spacer elements 32 confront the siding 116, and an air space is provided along the face 28 of the web 22 between the spacer elements 32 and between the face 28 and the siding 116. Thus, any moisture, such as rain water, which finds its way into the wall structure will be provided with a drainage path down and out of the wall. To this end, the spacer product 20 also functions as a rain screen for the inner sheathing member 112. In addition, the apertures 36 formed in the spacer elements can provide a more direct path for rain water to trickle down through the spacer product 20.

By way of example, and not by way of limitation, the spacer product 20 is preferably provided having a transverse thickness "T" between oppositely located apex portions in a range of about ⅛ to ¾ inches, although other thicknesses can be provided. Attachment areas of the spacer product 20 can be located every 9 feet lengthwise along the spacer product and can provide 3 inch diameter areas in which spacer elements only extend in one direction from the web 22. This permits ease of attachment and prevents spacer elements from being crushed during installation. The number, size, shape and layout configuration of the spacer elements can vary as desired provided that a flow of air can extend along both faces of the spacer product.

Thus, the above-described building structure and spacer product according to the present invention provides a cost effective spacer product for use in wall and roof constructions.

While a preferred spacer product and preferred roof and wall constructions have been described in detail, various modifications, alterations, and changes may be made without departing from the spirit and scope of the spacer product and building structures according to the present invention as defined in the appended claims.

What is claimed is:

1. A spacer product for providing a drainage path and air space within a building structure so as to retard deterioration of the building structure, consisting essentially of:

a continuous, indeterminate-length, roll-form web of thermoplastic material having a front face and a rear face, said web capable of being rolled lengthwise into a spiral roll during manufacture and unrolled lengthwise in a substantially straight direction during installation;

a first set of hollow spacer elements integrally formed on said web and projecting outwardly from said front face of said web, each spacer element of said first set of spacer elements having an apex portion such that a drainage path and air space is created extending adjacent and along said front face; and a second set of hollow spacer elements formed integrally on said web and projecting outwardly from said rear face of said web in an opposite direction relative to said first set of spacer elements, each spacer element of said second set of spacer elements having an apex portion such that a drainage path and air space is created extending adjacent and along said rear face;

said first set of hollow spacer elements being offset from said second set of hollow spacer elements.

2. A spacer product according to claim 1, wherein said web has a series of apertures formed therein for creating a transverse drainage paths through said web.

3. A spacer product according to claim 2, wherein said series of apertures are located on said first and second set of spacer elements.

4. A spacer product according to claim 3, wherein said series of apertures are located on said apex portions of said first and second set of spacer elements.

5. A spacer product according to claim 3, wherein said first set of hollow spacer elements are formed in a grid pattern on said web, wherein said second set of hollow spacer elements are formed in a grid pattern on said web, and wherein said grid pattern of said first set of hollow spacer elements is offset from said grid pattern of said second set of hollow spacer elements.

6. A spacer product according to claim 5, wherein one of said first and second sets of hollow spacer elements extend continually on said web.

7. A spacer product according to claim 1, wherein said first set of hollow spacer elements are formed by integral portions of said web having been deformed outwardly from said front face of said web, and wherein said second set of hollow spacer elements are formed by integral portions of said web having been deformed outwardly from said rear face of said web.

8. A building structure having a drainage passageway and air space therein so as to retard deterioration of the building structure, comprising:

an inner sheathing member providing a wall of a building structure;

a web of thermoplastic material affixed to and overlying said inner sheathing member, said web having a front face and a rear face; and an outer building material affixed to said inner sheathing member and overlying said web;

said web having a first set of integrally formed hollow spacer elements projecting outwardly from said front face of said web providing a drainage path and air space adjacent said front face;

said web having a second set of integrally formed hollow spacer elements on said web and projecting outwardly from said rear face of said web in an opposite direction relative to said first set of spacer elements to provide a drainage path and air space adjacent said rear face; and said first set of hollow spacer elements being offset from said second set of hollow spacer elements.

9. A building structure according to claim 8, wherein said web is capable of being rolled lengthwise into a spiral roll during manufacture and unrolled lengthwise in a substantially straight direction during installation.

10. A building structure according to claim 9, wherein said web has a series of apertures formed therein for creating a drainage and ventilation path transversely through said web.

11. A building structure according to claim 10, wherein said series of apertures are located on said first and second set of spacer elements.

12. A building structure according to claim 11, wherein said first set of hollow spacer elements are formed in a grid pattern on said web, wherein said second set of hollow spacer elements are formed in a grid pattern on said web, and wherein said grid pattern of said first set of hollow spacer elements is offset from said grid pattern of said second set of hollow spacer elements.

13. A building structure according to claim 12, wherein one of said first and second sets of hollow spacer elements extend continually on said web.

14. A building structure according to claim 8, wherein said inner sheathing member is a sidewall sheathing of the building, and wherein said outer building material is a sidewall building material.

15. A building structure according to claim 8, wherein said inner sheathing member is a roof deck sheathing of the building, and wherein said outer building material is a roofing material.

16. A building structure according to claim 8, further comprising a membrane located between said inner sheathing member and said web.

17. A building structure according to claim 16, wherein said membrane is selected from the group consisting of a housewrap material, an asphalt impregnated felt and a building paper.

18. A building structure according to claim 16, wherein said membrane is vapor permeable and permits moisture to exit the building therethrough and blocks moisture from entering the building therethrough.

19. A building structure according to claim 16, wherein said membrane is a roofing felt.

20. A building structure according to claim 8, wherein said outer building material is selected from the group consisting of wood, brick, metal, fiber cement, vinyl, siding material, stucco and EIFS.

21. A building structure according to claim 8, wherein said first set of hollow spacer elements are formed by integral portions of said web having been deformed outwardly from said front face of said web, and wherein said second set of hollow spacer elements are formed by integral portions of said web having been deformed outwardly from said rear face of said web.

22. A building structure having a drainage passageway and air space therein so as to retard deterioration of the building structure, comprising:

an inner sheathing member providing a wall of a building structure;

a membrane overlying said inner sheathing member;

a web of thermoplastic material affixed to and overlying said membrane, said web having a front face and a rear face and being capable of being rolled lengthwise into a spiral roll during manufacture and unrolled lengthwise in a substantially straight direction during installation; and an outer building material affixed to said inner sheathing member and overlying said web;

said web having a first set of integrally formed spaced-apart hollow spacer elements projecting outwardly from said front face of said web to provide a drainage path and air space adjacent to said front face, each spacer element of said first set of spacer elements having an apex portion;

said web having a second set of integrally formed spaced-apart hollow spacer elements on said web and projecting outwardly from said rear face of said web in an opposite direction relative to said first set of spacer elements for providing a drainage path and air space adjacent to said rear face, each spacer element of said second set of spacer elements having an apex portion;

said first and second sets of hollow spacer elements being formed in grid patterns on said web and said first set of hollow spacer elements being uniformly offset from said second set of hollow spacer elements;

said web having a series of apertures formed therein for creating a drainage and air flow path extending transversely through said web, said series of apertures being located on said apex portions of said first and second set of spacer elements; and said first set of hollow spacer elements being formed by integral portions of said web having been deformed outwardly from said front face of said web, and said second set of hollow spacer elements being formed by integral portions of said web having been deformed outwardly from said rear face of said web.

* * * * *